V. N. LANDQVIST.
MEANS FOR STOPPING WORKING MACHINES.
APPLICATION FILED JULY 7, 1915.
1,241,859.
Patented Oct. 2, 1917.
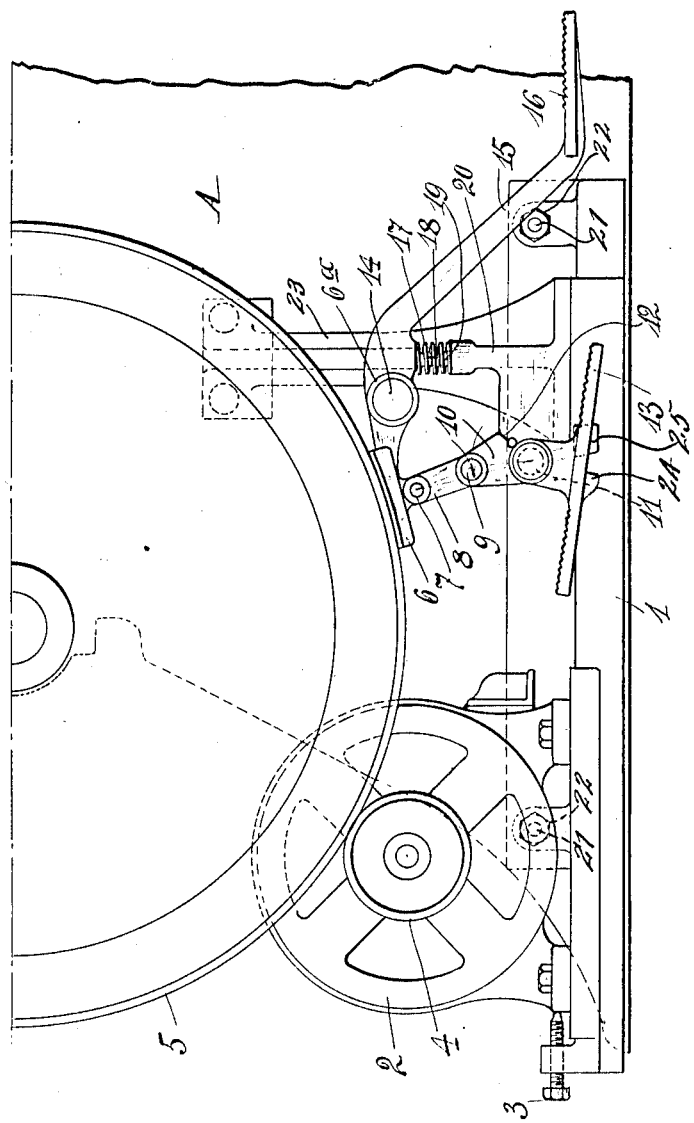
Inventor:
Victor Nathanael Landqvist
by attorneys
Brown Seward

UNITED STATES PATENT OFFICE.

VICTOR NATHANAEL LANDQVIST, OF GOTTENBORG, SWEDEN, ASSIGNOR TO AKTIEBOLAGET PRINCEPS, OF GOTTENBORG, SWEDEN.

MEANS FOR STOPPING WORKING MACHINES.

1,241,859.       Specification of Letters Patent.       Patented Oct. 2, 1917.

Application filed July 7, 1915. Serial No. 38,626.

*To all whom it may concern:*

Be it known that I, VICTOR NATHANAEL LANDQVIST, a subject of the King of Sweden and resident of Drottninggatan 50, Gottenborg, in the Kingdom of Sweden, have invented certain new and useful Improvements in Means for Stopping Working Machines, of which the following is a specification, reference being had therein to the accompanying drawing.

This invention relates to means for an easy and rapid stopping of working machines (for instance automatic printing presses), motion transmitting devices and the like. According to this invention, a driving wheel of a motion transmitting device is journaled on a yielding plate, on which a treadle or the like is mounted for the actuating of a braking device, adapted to act against a second wheel, which is journaled in the frame of the machine and normally is in frictional contact with the said driving wheel, so that, as the said treadle is depressed for causing the braking device to act against the said driven wheel, the said plate will yield for some distance and the driving wheel is brought out of contact with the driven wheel at the same time as the latter is braked. The driven wheel is journaled in such manner that it can yield for some distance when subjected to the pressure of the braking device. Owing to the fact that both the wheels consequently are moved from one another during the braking operation, a very slight displacing of the wheels is sufficient for breaking the contact of the wheels.

A form of the invention is shown in the accompanying drawing.

On a plate or shelf 1, fixed to the frame A of the machine by means of screw bolts 21 with nuts 22, an electro-motor 2 is mounted in the ordinary manner by means of set screws 3. The friction disk 4 of the said motor drives the fly wheel 5 of the working machine arranged like a friction wheel. Besides, the said shelf 1 is connected with the frame A, by means of a bracket 23. A lever 10 is pivoted at 11 to the said bracket 23 and is jointed at 9 to a link 8, which at 7 is jointed to a brake block 6, adapted to act against the fly wheel 5. A treadle 13 is connected with the lever 10, and is so arranged that it can be oscillated by means of the foot in one as well as in the opposite direction. The said brake block 6 is provided on the one end of a two-armed lever 15, which is pivoted at 14 to the bracket 23 and on the other end of which a treadle 16 is provided. Between the pin 14 and the treadle 16, the said lever 15 is acted upon by a spiral spring 17, encircling a pin 18, extending downward from the said lever and also encircling a pin 19 on a part 20 of the bracket 23. The shaft of the fly wheel 5 is journaled in such a manner that when the braking device is caused to operate, the shaft is raised for some distance in its bearing by the pressure of the braking device 6.

While the machine is normally driven by the motor 2, the toggle arrangement formed by the link 8 and the lever 10 occupies the bent position shown in the drawing, so that the brake block 6 is out of contact with the fly wheel 5. The said position of the toggle arrangement is determined by an abutment 12 on the bracket 20, against which the lever 10 is forced by the spring 17. If the operator will stop the machine without stopping the motor, he forces the left hand part of the treadle 13 downward so that the toggle arrangement is brought into the straight position and the brake block is forced against the fly wheel against the pressure of the spring 17. By the pressure thus exerted on the treadle and consequently on the shelf 1, the latter is forced downward owing to the springy capacity, which, though slight, however, always exists in the plate forming the shelf. Consequently the motor 2 with the disk 4, is moved downward. At the same time the fly wheel 5 is raised by the pressure of the brake block 6 and is braked by the same. Consequently, the disk 4 and the fly wheel 5 are moved out of contact with one another, while the machine is braked simultaneously. Owing to the said fact the machine may be stopped very rapidly and with a slight output of work of the operator. Consequently, owing to the fact that both the disk 4 and the fly wheel 5 are moved from one another, a very slight displacement of the disk and the fly wheel is sufficient for breaking the contact of the same. The toggle arrangement 8, 10, is held in the straight position by a projection 24 on the lower side of the treadle bearing against an abutment 25 provided on the shelf 1. The straightened toggle arrangement keeps the fly wheel out of contact with the disk 4. As the machine is to be started, the treadle 13 is swung into the position shown in the drawing, which is effected by actuating the right hand part of the same. The brake block 6 is thereby brought out of contact with the fly wheel, so that the said wheel will sink into its normal position. As the treadle is released, also the shelf returns into its normal position. Consequently, the disk 4 and the fly wheel are again brought into contact with one another. If the operator desires to reduce the speed of the machine without stopping the same, the treadle 16 is depressed for the necessary distance. It is of importance that the motor is mounted on a part (the shelf) fixed to the frame of the machine in order that the disk 4 and the fly wheel 5, during the operation of the machine, may not bump against one another during the vibrations of the machine. Such bumping takes place when the motor is mounted separately on the floor (as hitherto has been the case) and very rapidly spoils the leather covers of the disk and the fly wheel.

What I claim is:

In means for stopping working machines, for instance automatic printing presses, and other motion transmitting devices, the combination of a driving friction wheel, a treadle, a yielding plate on which the said driving wheel and the treadle are located, a displaceable driven friction wheel, journaled in the frame of the machine, and a braking device connected with the said treadle and adapted to act upon the said driven wheel, substantially as described and for the purpose set forth.

In witness whereof, I have hereunto signed my name.

VICTOR NATHANAEL LANDQVIST.

Witnesses:
G. LINDSTROM,
OSKAR FORSBERG.

Copies of this patent may be obtained for five cents each, by addressing the "Commissioner of Patents, Washington, D. C."